United States Patent [19]

Persinger

[11] 4,247,321

[45] Jan. 27, 1981

[54] METHOD AND APPARATUS FOR OBTAINING FERTILIZING SOLUTION FROM FOSSIL FUELED STATIONARY ENGINES

[76] Inventor: James G. Persinger, Box 477, Hugoton, Kans. 67951

[21] Appl. No.: 40,926

[22] Filed: May 21, 1979

Related U.S. Application Data

[63] Continuation-in-part of Ser. No. 33,028, Apr. 24, 1979.

[51] Int. Cl.³ ............................................. C05C 11/00
[52] U.S. Cl. ........................................... 71/59; 71/60; 71/64 C; 71/64 SC; 423/235; 423/395
[58] Field of Search .................. 60/301; 71/1, 59, 60, 71/64 C, 64 SC, 64 G; 423/235, 393, 395, 400

[56] References Cited

U.S. PATENT DOCUMENTS

| | | | |
|---|---|---|---|
| 1,029,528 | 6/1912 | Bosch et al. | 423/235 |
| 1,348,873 | 8/1920 | Guye | 423/394 |
| 1,458,595 | 6/1923 | Riedel | 71/1 |
| 2,936,548 | 5/1960 | Morrison | 71/1 X |
| 2,947,112 | 8/1960 | Morrison | 71/1 X |
| 3,733,393 | 5/1973 | Couillaud et al. | 423/235 X |
| 3,773,897 | 11/1973 | Fields et al. | 423/235 |
| 3,888,652 | 6/1975 | Yie et al. | 71/64 C X |
| 3,911,081 | 10/1975 | Maness et al. | 423/395 X |
| 3,949,055 | 4/1976 | Schneider et al. | 423/235 X |
| 4,133,671 | 1/1979 | Mikel | 71/64 C X |

Primary Examiner—Robert H. Spitzer
Attorney, Agent, or Firm—Frank Frisenda, Jr.

[57] ABSTRACT

A method and apparatus for obtaining fertilizing solution from fossil fueled stationary engines by adding carbon dioxide and nitrogenous compounds, derived from exhaust gases, and ozone gas derived from a generator, to water so as to produce a fertilizing solution which promotes crop growth. The method comprises direct contact of exhaust gases derived from fossil fueled combustion engines particularly natural gas fired compressors, with water solution containing ozone gas and an agent selected from the group consisting of lime, limestone, calcium phosphate and/or mixtures thereof in a scrubber, cooling the enriched water from the scrubber, recycling the cooled enriched water through the scrubber until a desired concentration of carbon dioxide and nitrogen compounds are achieved and collecting the enriched water in a storage facility.

17 Claims, 1 Drawing Figure

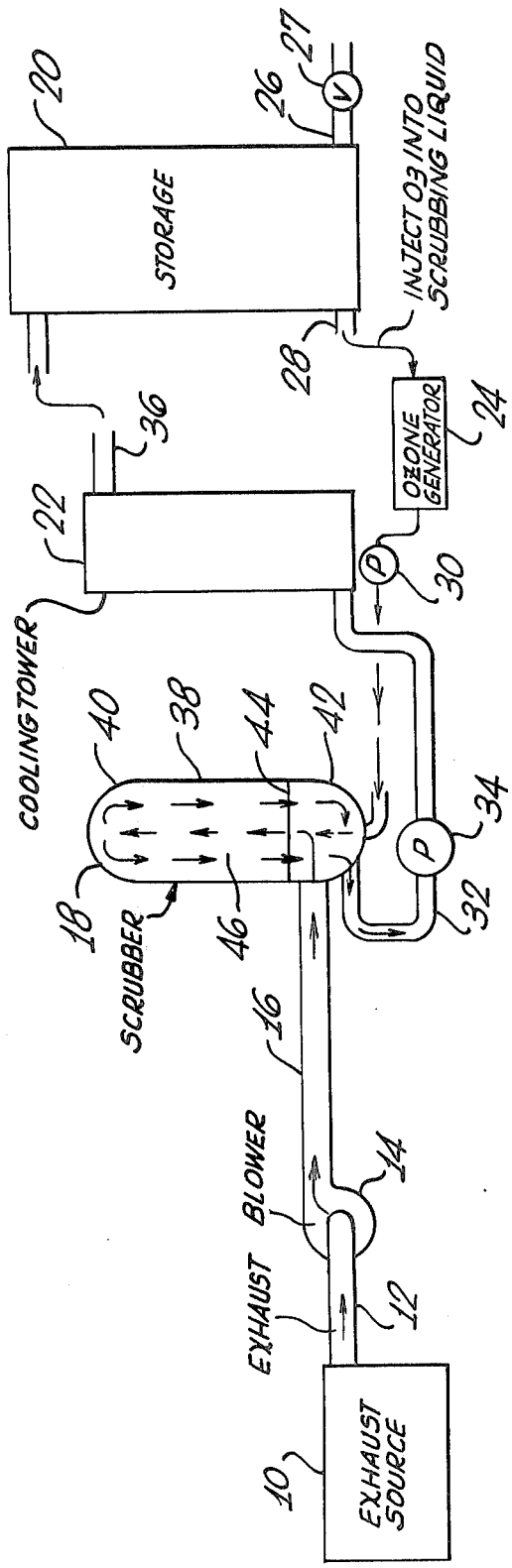

METHOD AND APPARATUS FOR OBTAINING FERTILIZING SOLUTION FROM FOSSIL FUELED STATIONARY ENGINES

CROSS REFERENCE TO RELATED APPLICATIONS

This application is a continuation in part of my previous U.S. patent application Ser. No. 33,028 filed on Apr. 24, 1979, for Method and Apparatus for Obtaining Fertilizing Solution from Fossil Fueled Stationary Engines.

BACKGROUND OF THE INVENTION

This invention relates generally to a method and apparatus for obtaining fertilizing solutions from water directly contacted with exhaust gases of stationary engines using fossil fuels and ozone gas derived from an ozone generator.

In an earlier patented invention by Mikel, U.S. Pat. No. 4,133,671 there was described a system for enhancing the fertilizing characteristics of irrigation water. While extremely effective as a system for producing and adding fertilizing ingredients to irrigation water, the present invention seeks to improve the Mikel system and to further maximize desirable exhaust gas emissions in the solution, preferably derived from natural gas fired compressor engines and adding ozone gas derived from an ozone generator. In this manner, the present invention provides a solution which may be utilized for promoting crop growth or as a starting material for instance, for urea production.

In a number of areas of the world, it is possible to tap underground sources of natural gas by relatively simple wells and equipment. Moreover, in many geographical areas where natural gas can be easily extracted and secured, such areas are also suitable for agricultural growth.

As one of the three most important fuels, natural gas is an important mineral commodity of commerce. The gas consists predominantly of a mixture of gaseous hydrocarbons found in rocks of the earth's crust, sometimes at shallow depths below the surface. It is produced from gas and oil wells and is widely distributed through pipelines. Because of its excellent combustion characteristics and fluid properties, natural gas is highly regarded as a fuel for residential, commercial, and industrial uses.

Deposits of natural gas are found in about 30 of the states of the United States and in many foreign countries. Accumulations occur characteristically in rocks of sedimentary origin (sandstones, limestones, and shales), where structural relationships have provided a trap to arrest the migratory movement of the fluids.

In the United States, certain farming areas in the Mid-West, for example, overlie petroleum deposits. In these areas, it is not uncommon for farmers to drill a well so as to tap a fuel source such as natural gas and then use this gas to power a combustion engine which is used to drive machinery. Mid-Western agricultural areas are also transversed by natural gas pipelines in which compressors, used to maintain the flow of gas, are themselves driven by engines powered with natural gas. Still other agricultural areas are near thermal power plants which use a variety of fuels to produce electricity. Each of these locations produces, as a byproduct of combustion operations, oxides of nitrogen and carbon which are soluble in water.

In some geographical areas which have alkali soil, salts present in the soil are deleterious to crop growth. Such soil may also have poor water penetration which will inhibit crop growth and resultant crop yield. Other areas have imbalanced pH soil which prevents release of plant nutrients and inhibits the desirable decay of organic matter in the soil.

Needless to say, it is desirable, if not necessary, to also provide means for fertilizing agricultural crops to stimulate growth and secure the greatest crop yield. While a soluble form of nitrogeous compounds and carbon dioxide is not a complete fertilizer in and of itself, such a mixture is one of the most important constituents added to soil for ensuring a supply of the nutrients needed.

Combustion engines using fossil fuels make use of air to provide oxygen necessary for combustion. Approximately four-fifths of the intake air to the engine is nitrogen which does not enter into the combustion process per se, but rather is converted, at least to some extent, into the various oxides of nitrogen ($NO_x$). The exhaust gases: $CO_2$, nitrogen oxides such as NO, $NO_2$ and other nitrogenous compounds, sulphur oxides ($SO_x$ such as $SO_2$) are partially soluble in water or capable of being suspended in water and provide a solution that may be used by plants as a fertilizer. Fortuitously, the exhaust materials which result from the combustion process and which would otherwise be polluting the atmosphere are instead converted into a desirable fertilizing solution for promoting crop growth.

Hence, those concerned with stimulation of crop growth and utilization of various geographical areas for agricultural purposes have recognized a significant need for a system which improves soil characteristics and reduces air pollution at a modest cost while at the same time provides an ample supply of fertilizing solution. The present invention fulfills this need.

SUMMARY OF THE INVENTION

Briefly, and in general terms, the present invention provides a unique method and apparatus for direct contact of exhaust gas emissions from a fossil fueled combustion source with water in a scrubber, adding ozone gas derived from an ozone generator to the water supply of the scrubber, cooling the enriched water flowing from the scrubber, recycling the enriched water through the scrubber until a desired concentration of nitrogen compounds and carbon dioxide is achieved, treating the enriched water by direct contact with lime, limestone, calcium phosphate and/or mixtures thereof; storing and then utilizing the resultant enriched solution for crop fertilization.

Basically, the present invention comprises a system for treating exhaust gas emissions from a combustion source which is fueled by a natural gas, liquified petroleum, diesel fuel, coal or mixtures thereof. The exhaust gases are cleaned of a least a portion of desirable contaminates for preparing a fertilizing solution by direct contact with water containing ozone gas in a scrubber.

More specifically, and in a presently preferred embodiment of the invention, the system includes a combustion engine whose exhaust gases are directed by a blower into a scrubber such as a spray tower. Ozone gas derived from an ozone generator is injected into the water flowing to the scrubber to aid in the oxidation of certain nitrogen compounds. In the scrubber, the exhaust gases are mixed with the water containing ozone gas, causing the carbon dioxide and nitrogen oxides ($NO_x$) components of the exhaust gases to be absorbed in the water. The enriched water is pumped through a cooling tower before being directed to a storage facility from which the enriched water is recycled to the scrubber.

Moreover, it has been found that the addition of ozone gas to the exhaust gas stream itself is desirable in the absorption process if the temperature of the exhaust gas stream is 300° F. or below. However, if the exhaust gas stream exceeds 300° F., no ozone gas is injected into the gas stream but rather into the scrubbing liquid.

A continuous treatment of the enriched water by direct contract with an agent selected from the group consisting of lime, limestone, calcium phosphate and/or mixtures thereof in an amount of at least 5 percent by weight is particularly beneficial in that the treatment converts deleterious sulphur oxide gases to calcium sulphate while at the same time adjusting the pH of the enriched solution to within a range of 6 to 7.

Accordingly, the system of the present invention provides a usuable solution of nitrogen compounds of from about 17 to 50% by weight of calcium nitrate, and further containing a maximum amount of $CO_2$ resulting in a solution which is beneficial, for instance, for fertilizing crops. The amount of useful components present in the final solution will of course vary according to the characteristics of the fuel, method of combustion, the size of the combustion chamber and the temperature of the exhaust gases. Thus, the forementioned environmental problems related to deleterious soil conditions and pollutants contaminating the atmosphere are substantially improved by the present system.

The above and other objects and advantages of this invention will become apparent from the following more detailed description, when taken in conjunction with the accompanying drawings of an illustrative embodiment.

BRIEF DESCRIPTION OF DRAWING

FIG. 1 is a schematic flow diagram of a system for obtaining fertilizing solution from fossil fueled stationary engines in accordance with a preferred embodiment of the present invention.

DESCRIPTION OF THE PREFERRED EMBODIMENT

Briefly, and in general terms, the present invention provides a unique method and apparatus for directly contacting, in a scrubber, exhaust gas emission from a fossil fueled combustion source with water having ozone gas derived from an ozone generator, and an agent selected from the group consisting of lime, limestone, calcium phosphate and/or mixtures thereof, cooling from the enriched water through the scrubber until a desired concentration of nitrogen compounds and carbon dioxide is achieved, collecting the enriched water in a storage facility; and then utilizing the resultant enriched solution, for instance, for crop fertilization.

As illustrated in FIG. 1, the basic elements of the present system include an exhaust gas source 10 such as internal combustion engine, or combustion furnaces, or the like, that is powered by a fossil or hydrocarbon fuel such as natural gas, liquified petroleum, coal products or mixtures thereof. The exhaust gases including oxides of nitrogen and carbon are carried by a suitable stack 12 to a blower 14 which directs them through a duct 16 to a scrubber 18 where soluble components of the gases are absorbed in water containing ozone gas and an agent selected from the group consisting of lime, limestone, calcium phosphate and/or mixtures thereof. Of course, multiple exhaust sources can be connected to the scrubber 18, in series or parallel sequence, and can be utilized for providing increased amounts of exhaust gas. Water for the scrubber 18 is provided from a storage tank 20. The exhaust gases flowed to the scrubber 18 heats the water containing ozone gas and the agent and is subsequently cooled in a cooling tower 22 before being directed to the storage tank 20.

In accordance with the present invention the scrubber 18, the cooling tower 22 and the water storage tank 20 form a recirculation system in which water is continuously re-circulated such that the concentration of desired nitrogen and carbon compounds is continuously increased in the aqueous solution. In one embodiment, water in the system is recirculated until the level of nitrogen oxide reaches between 170,000 and 500,000 ppm and the level of $CO_2$ reaches 15,000 to 50,000 ppm. An ozone generator 24 injects ozone gas ($O_3$) into the stream of water to the scrubber 18 thereby producing $H_2O_2$ which oxidizes $NO_x$ into more useful $NO_2$ and $NO_5$. In this regard it has also been determined that the addition of ozone gas to the exhaust gas stream 12 is desirable, if the temperature of the exhuast gas stream is 300° F. or below.

A continuous direct contact treatment of the enriched water in the storage tank 20 with lime, limestone, calcium phosphate and/or mixtures thereof in an amount of at least 5 percent by weight and preferably from about 20 to about 30 percent by weight water is particularly beneficial in that the treatment converts deleterious sulphur oxide gases to calcium sulphate while at the same time adjusting the pH of the enriched solution to within a pH range of from 6 to 7.

The supply of fresh water to be enriched is added to the storage tank 20 through an inlet pipe 26, guarded by a valve 27, which is also used to remove the fertilizing solution from the storage tank 20. Water is carried from the storage tank 20 to the scrubber 18 by a flow pipe 28. A pump 30 disposed in flow pipe 28 provides a sufficient pressure head to carry the fluid and to operate the scrubber 18. The ozone gas derived from the ozone generator 24 may be conveniently added to the water when as it flows the pipe 28. Water leaving the scrubber 18 enters the discharge pipe 32 which carries it to the cooling tower 22. A second pump 34 maintains the flow of water through the discharge pipe 32 and the cooling tower 22. A cooling tower output pipe 36 carries water from the cooling tower 22 to the storage tank 20.

Turning now to a description of some of the major foregoing elements in greater detail, the source of exhaust gas for the system can be the exhaust from any internal or external combustion engine which uses as a fuel natural gas, liquified petroleum products, coal, or liquified hydrocarbon fuels. When most of the above-described fuels are used in combustion engines, their exhaust gases contain elementary and oxidized nitrogen, carbon, and sulphur. Examples of suitable stationary sources of exhaust gases include internal combustion engines, driving pumps and turbines and combustion sources and the like associated with thermal power plants. A stationary engine (not illustrated) driving a compressor in a natural gas pipeline, and using natural gas as a fuel, is a preferred stationary engine with which the present invention system can be used. Preferably such stationary engines will be adjusted to burn a lean fuel-air mixture (about 16 parts air to 1 part fuel, or richer), at a voltage of from about 12 volts to about 50,000 volts producing great fuel efficiency, whereby the engine produces an exhaust high in oxides of nitrogen. However, adjustment of the engine to achieve such exhaust gas concentration is not required for use in conjunction with the present system.

The exhaust gas emissions are forced by the blower 14, having any standard design capable of sustained operation, into the scrubber 18. Suitable cooling means such as a cooling tower may optionally be interposed between the blower 14 and scrubber 18 for cooling the exhaust gas emissions to a temperature of 300° F. or below, if it is desired to inject ozone gas directly into the exhaust gas stream to supplement or replace the ozone gas in the scrubbing water. The scrubber 18 may be of either a horizontal design (not shown) or a vertical design as depicted in FIG. 1. Exhaust gas and water containing ozone gas are directly contacted with each other inside the scrubber 18. Suitable design of the scrubber contact chamber, include a spray chamber, a dry pack bed, or a venturi type.

One design for the scrubber is indicated in FIG. 1. A generally cylindrical housing 38 disposed at its upper end and lower end by members shown here as upper and lower domes 40 and 42 respectively. The exhaust inlet duct 16 is preferably connected a short distance above the lower dome 42 and the water supply, provided by pipe 28, is connected to the interior of the housing 38, preferably near the upper dome 40. Just above the connection between the exhaust duct 16 and the cylinder wall 38 is a screen 44 that supports a bed of packing material 46 somewhat similar to aggregate. The material 46 preferably is a one-inch ceramic material having a generally U-shape, widely used in such absorption chambers and commercially available under the name "Berl Saddle Tower Pack".

The scrubber 18 is designed so that the water in the scrubber is preferrably fed in at the upper dome 40 and flows by force of gravity. However, those skilled in the art will appreciate that other suitable scrubbers and manner of inlet for the scrubber water may be utilized in accordance with the present invention. Conduit 48 (not shown) carry the water from the top of the scrubber 18 to the scrubber discharge pipe 32 located near the bottom of the scrubber. The scrubber 18 is a vessel having openings through which exhaust gases or steam may escape.

Water in the scrubber discharge pipe 32 is propelled from the scrubber 18 by a pump 34, which may be any standard pump capable of sustained operation with liquids, to the cooling tower 22. The cooling tower 22 may be of any design and its capacity need only be sufficient to cool the enriched water to a temperature about 140° F. or below. The required capacity of the cooling tower 22 varies from geographical location owing to differences in the ambient temperature which influence the efficiency of the tower.

The water storage tank 20 is a vented large reservoir having sufficient capacity, herein between about 10,000 and 30,000 gallons, to provide a relatively long fertilizing cycle for the assembly and to allow further water cooling. The storage tank 20, like other parts of the assembly, must be made of corrosion resistant material, such as stainless steel or fiberglass. However, no specific shape or dimension of the holding tank is required.

As water leaves the storage tank 20 to return to the scrubber 18 through the pipe 28, ozone gas from the ozone generator 24 is injected into the water. Suitable ozone generators are commercially available from Source Gas Analyzers and from Scientific Industries, both of Garden Grove, Calif., and from Quest Environmentalists of Santa Ana, Calif. Other suitable types of ozone generators are disclosed U.S. Pat. Nos. 2,404,778 and 2,704,274, both to D. K. Allison. The ozone gas injected into the water produces hydrogen peroxide $H_2O_2$, which oxidizes the radicals of $NO_x$ into radicals of $NO_2$ through $NO_5$. The required capacity of the ozone generator 24 varies with the size of the assembly and the source of exhaust gases. When the assembly is used with an internal combustion engine, an ozone generator capable of producing at least approximately 2 lbs. of ozone gas per hour for each 100 horsepower of output of the engine producing the exhaust is required.

The pump 30 in the water storage line 28 acts to insure that sufficient inlet pressure in the scrubber 18 is achieved to begin and continue circulation of the water through the scrubber 18. Any standard design pump for liquids is suitable for this purpose.

When used with internal combustion engines of the type powering natural gas compressors used in natural gas transmission lines, the exhaust gases in the engine (not shown) are produced in combustion chambers having a temperature range from 1200° F. to 1500° F. Construction of the stack 12, the duct 16, and the blower 14 which permits the exhaust gases to be introduced into the scrubber while the gas temperature ranges between 600° F. to 900° F. will produce excellent results. While successful results will also be achieved when exhaust gases are colder and when the amount of oxides of nitrogen is greater, it is not intended that the conditions in the engine be modified to produce different exhaust gas ratios. It has been found that when water is continuously recirculated, the present invention will produce a solution containing between about 170,000 to 500,000 ppm of nitrogen compounds while the carbon dioxide in the solution will range from between about 15,000 to 50,000 ppm. The concentration of sulphur, depending on the amount of sulphur in the fuel, can range as high as 50,000 ppm, however, as previously described herein, continuous treatment with lime (CaO), limestone ($CaCO_3$) calcium phosphate ($CaPO_3$), and/or mixtures thereof will convert sulfur present in the solution to calcium sulfate and convert nitrogen oxides to calcium nitrate ($Ca(NO_3)$). The present invention will produce a recovery rate of nitrogen compounds of between 5 and 10 lbs. of useful nitrogen per hundred horsepower output of internal combustion engine per hour. Also, it has been determined that water having an initial pH of 8 will, after final treatment, have a pH of from about 6 to 7.

Accordingly, the system herein described and shown is useful in recovering a commercially valuable agricultural fertilizing solution from exhaust gases. The system produces these commercially valuable substances from the very by-products of combustion which are normally the most undesirable pollutants, namely $NO_x$. When the assembly is attached to a stationary power source whose exhaust gases are otherwise vented to the atmosphere or scrubbed, the assembly, at the small cost of running its pumps and ozone generator, recovers valuable fertilizer material.

Owing to the large water capacity and simplicity of design the assembly can be left to run for very long cycles, a feature which is especially useful in installations at remote locations.

The treated water, with its increased $CO_2$ and nitrogen content and lowered pH is useful in reclaiming alkalized soil by lowering the amount of basic salts present in such soil and by promoting the decay of organic matter in the soil. Additionally, such soil, when wetted with water having dissolved $CO_2$ has been found to have increased water penetration and increased ability to utilize nitrogen.

While the preferred form of the invention has been disclosed, it is appreciated that modification may be made herein without departing from the broad concept. Consequently, this patent is not to be restricted to the particular form or arrangement of parts herein described and shown except as limited by the claims.

I claim:

1. A method for obtaining fertilizing solution from fossil fueled stationary engines by scrubbing exhaust gases from a combustion source with water containing ozone gas, the method comprising the steps of:
    operating a combustion source, to produce an exhaust gas having carbon dioxide and nitrogen oxide gases;
    flowing said exhaust gas to a direct contact liquid-gas scrubber;
    injecting ozone gas derived from an ozone generator into a water stream to said scrubber;
    absorbing said carbon dioxide and nitrogen oxide gases in water containing ozone gas by direct contact with the water stream in said scrubber;
    treating by continuous direct contact the enriched solution from said scrubber with from about 20 to about 30 percent by weight of an agent selected from the group consisting of lime, limestone, calcium phosphate and mixtures thereof;
    cooling the enriched solution from said scrubber;
    recycling the cooled enriched solution through said scrubber to achieve a concentration of between about 170,000 to 500,000 ppm nitrogen compounds and between about 15,000 to 50,000 ppm carbon dioxide; and
    collecting the treated enriched solution.

2. A method as defined in claim 1 wherein said combustion source is an internal combustion engine powered by a fuel selected from the group consisting of natural gas, liquified petroleum, diesel fuel, and mixtures thereof.

3. A method as defined in claim 2 in which said engine is adjusted to provide a temperature in the combustion chamber of about 1200° F. to 1500° F., and in which said exhaust gases are directly contacted with a continuous spray of water in a countercurrent manner.

4. A method as defined in claim 2 in which said engine is a natural gas fired compressor used in gas pipeline transmission.

5. A method as defined in claim 1 wherein said combustion source is a combustion furnace fueled by a fuel selected from the group consisting of natural gas, liquified petroleum, coal, hydrocarbon solids, and mixtures thereof.

6. A method as defined in claim 1 in which said exhaust gas is directly contacted with a continuous flow of water.

7. A method as defined in claim 1 in which said absorption occurs in a contact chamber scrubber.

8. A method as defined in claim 7, in which said scrubber is a spray chamber scrubber.

9. A method as defined in claim 7, in which said scrubber is a dry packed bed scrubber.

10. A method as defined in claim 7, in which said scrubber is a venturi scrubber.

11. A method as defined in claim 1 and further including the steps of cooling the exhaust gas from said combustion source to a temperature of 300° F. or below and introducing ozone gas to the exhaust gas stream.

12. A method as defined in claim 1 wherein said combustion source is an internal combustion engine operated at a temperature of between about 1200° F. to 1500° F. in the combustion chamber and voltage of more than 12 volts across the sprak plugs of said engine.

13. A method as defined in claim 1 wherein said ozone gas in injected into said water stream at a rate of at least about 2 lbs. of ozone gas per hour for each 100 horse power of output of the combustion source.

14. A solution produced by the method of claim 13.

15. A method as defined in claim 1 wherein the enriched solution from said scrubber is cooled to a temperature of 140° F. or below.

16. A solution produced by the method of claim 1.

17. A solution produced by the method of claim 1 and having a calcium nitrate concentration of between about 17 to 50 percent by weight.

* * * * *